United States Patent
Tibbs et al.

(10) Patent No.: US 10,428,957 B2
(45) Date of Patent: Oct. 1, 2019

(54) DYNAMIC VALVE SEAL HAVING RETAINING FEATURES

(71) Applicant: Delavan Inc., West Des Moines, IA (US)

(72) Inventors: Andy W. Tibbs, Earlham, IA (US); Neal A. Thomson, West Des Moines, IA (US)

(73) Assignee: Delavan Inc., West des Moines, IA (US)

( * ) Notice: Subject to any disclaimer, the term of this patent is extended or adjusted under 35 U.S.C. 154(b) by 42 days.

(21) Appl. No.: 15/705,844

(22) Filed: Sep. 15, 2017

(65) Prior Publication Data

US 2018/0017171 A1    Jan. 18, 2018

Related U.S. Application Data

(62) Division of application No. 14/605,062, filed on Jan. 26, 2015, now Pat. No. 9,765,894.

(51) Int. Cl.
*F16K 15/00* (2006.01)
*F16K 1/34* (2006.01)
(Continued)

(52) U.S. Cl.
CPC ............... *F16K 1/34* (2013.01); *F02C 7/232* (2013.01); *F16J 15/3212* (2013.01); *F16J 15/3236* (2013.01); *F16K 15/025* (2013.01); *F23D 11/38* (2013.01); *F23K 5/147* (2013.01); *F05D 2240/55* (2013.01); *F16K 1/42* (2013.01); *Y10T 137/7867* (2015.04); *Y10T 137/7925* (2015.04)

(58) Field of Classification Search
CPC ......... Y10T 137/7866; Y10T 137/7867; Y10T 137/77925

USPC .......... 239/587; 251/363, 364; 277/230, 532
See application file for complete search history.

(56) References Cited

U.S. PATENT DOCUMENTS 3,199,833 A    8/1965    Skinner
4,071,220 A    1/1978    Iino
(Continued)

FOREIGN PATENT DOCUMENTS

DE    10323319 A1    12/2004
EP    2789917 A2    10/2014

OTHER PUBLICATIONS

Extended European Search Report issued in corresponding European Patent Application No. EP 16152831.0, dated Jun. 9, 2016.

*Primary Examiner* — Robert K Arundale
(74) *Attorney, Agent, or Firm* — Locke Lord LLP; Scott F. Wofsy; Joshua L. Jones (57) ABSTRACT

A dynamic seal assembly is disclosed for use in a valve having an upstream pressure side and a downstream pressure side, the dynamic seal assembly including an annular seal member having a generally C-shaped cross-section and including opposed upstream and downstream legs defining an internal cavity with an opening facing toward the upstream pressure side of the valve, wherein the upstream leg has a radial length that is greater than a radial length of the downstream leg and includes a retaining foot that extends angularly away from the upstream leg in an upstream direction at an angle of between about 0° and 90°, and a metallic spring is disposed within the internal cavity of the seal member for providing a constant sealing force to the seal member.

3 Claims, 6 Drawing Sheets

(51) Int. Cl.
  *F02C 7/232* (2006.01)
  *F23K 5/14* (2006.01)
  *F16J 15/3212* (2016.01)
  *F23D 11/38* (2006.01)
  *F16K 15/02* (2006.01)
  *F16J 15/3236* (2016.01)
  *F16K 1/42* (2006.01)

(56) References Cited

U.S. PATENT DOCUMENTS

| | | |
|---|---|---|
| 4,239,242 A | 12/1980 | Burns |
| 4,258,901 A | 3/1981 | Zinnai et al. |
| 4,362,184 A | 12/1982 | Marabeas |
| 5,732,730 A | 3/1998 | Shoemaker et al. |
| 7,513,270 B2 * | 4/2009 | Martin ................ F16K 17/0426 137/469 |
| 9,255,558 B2 | 2/2016 | Burke et al. |
| 9,267,606 B2 * | 2/2016 | Haland ................ F16K 5/0678 |
| 2010/0166582 A1 | 7/2010 | Racicot et al. |
| 2014/0305521 A1 | 10/2014 | Burke et al. |

* cited by examiner

DYNAMIC VALVE SEAL HAVING RETAINING FEATURES

CROSS REFERENCE TO RELATED APPLICATIONS

This application is a Divisional of U.S. patent application Ser. No. 14/605,062, filed Jan. 26, 2015. The contents of this application are incorporated herein by reference.

BACKGROUND OF THE INVENTION

1. Field of the Invention

The subject invention relates to valve seals, and more particularly, to a dynamic seal having retaining features for valve assemblies employed in the fuel injectors of gas turbine engines.

2. Description of Related Art

Check valves and schedule valves are commonly used in the fuel injectors of gas turbine engines to control fuel flow. These valves are designed to prevent the fuel system from draining on engine shutdown. They also eliminate fuel leaking into the combustor on shutdown, provide consistent system pressures during operation, and contain fuel expansion, driven by elevated fuel temperatures during soak back, after engine shutdown.

Drip tight seals are required in many check valves and schedule valves (also referred to as metering valves) used in fuel injectors. Typically, drip tight seals have been made from elastomers. For example, FKM (fluoroelastomer, i.e. Viton) or FFKM (perfluoroelastomer, i.e. Kalrez) have been used when engine operating conditions reach temperatures above 350° F. Elastomers are commonly used as O-rings or as molded seals attached to metallic components.

The elastomer used for a valve seal is typically the material which limits the allowable operating temperature of the valve. High temperatures degrade the elastomer (faster aging with higher temperature). Degraded elastomers tend to stick to metal and take on a permanent set. Cold temperatures shrink the elastomer and prevent it from forming a tight seal.

In most prior art check valves and schedule valves, the sealing surfaces move away from the seal as the valve opens. The elastomer seal is typically trapped in or molded to one of the valve components to prevent it from moving out of position. When the valve closes, the seal surface moves back to the elastomer and the leak proof seal is re-formed.

Spring energized PTFE seals are also used in fuel injectors. In such instances, they are typically positioned to allow system pressure to expand the inside of the seal. Moreover, the internal pressure on the PTFE would open the seal as the valve opens and possibly deform/extrude the PTFE seal. The normal position of the seal may work for relatively low pressure valves, but an extrusion failure mode may always be possible. Given these factors, using a standard spring energized PTFE seal in its normal configuration, as a dynamic valve seal would be problematic.

The solution to this problem, as provided by the subject invention, is to provide the spring energized PTFE seal with a retaining feature located on the upstream pressure side of the seal body. This supports the seal body and prevents the internal pressure from deforming/extruding the PTFE. The seal acts as a standard spring energized seal in that upstream pressure acts upon the inside of the seal body increasing the force on the seal surfaces. In addition, because the retaining feature of the seal is tightly held in the valve assembly, there is no path for debris to accumulate inside the seal groove.

Furthermore, by replacing a typical elastomeric O-ring seal with a spring energize PTFE seal, the temperature capability of the valve assembly can be greatly increased. Also, the likelihood of a thermal permanent set on a PTFE seal when compared to an elastomeric seal is reduced significantly due to the hardness of the seal material.

SUMMARY OF THE INVENTION

The subject invention is directed to a new and useful valve assembly for a fuel injector used in gas turbine engines. The valve assembly includes a sleeve member having an interior chamber, and a piston member supported for movement within the interior chamber of the sleeve member and delimiting an upstream pressure side of the valve assembly and a downstream pressure side of the valve assembly.

The valve assembly further includes a dynamic sealing device mounted to one of the sleeve member and the piston member for sealingly isolating the upstream pressure side of the valve assembly from the downstream pressure side of the valve assembly. More particularly, the dynamic sealing device can be secured to either the sleeve member or the piston member depending upon the configuration of the valve assembly and its operating environment.

The dynamic sealing assembly of the subject invention includes an annular seal member having a generally C-shaped cross-section including opposed upstream and downstream legs defining an internal cavity. Preferably, the seal member is formed from PTFE or a similar polymeric material.

In accordance with the invention, the internal cavity of the seal member faces toward the upstream pressure side of the valve assembly, and the upstream leg of the seal member has a radial length that is greater than a radial length of the downstream leg. The dynamic sealing device also includes a spring member that is disposed within the internal cavity of the seal member to provide a constant sealing force to the seal member. Preferably, the spring member is a helically wound metallic spring.

In embodiments of the invention, the upstream leg of the seal member includes a retaining foot that extends angularly away from the upstream leg in an upstream direction. More particularly, the retaining foot extends angularly away from the upstream leg of the seal member at an angle of between about 0° and 90°.

It is envisioned that the valve assembly of the subject invention can take a number of different forms. For example, the valve assembly can be constructed as a check valve assembly or a schedule valve assembly. Alternatively, the valve assembly can be constructed as a combined check valve and schedule valve, which is sometimes referred to as an integral valve assembly.

In certain embodiments of the valve assembly disclosed herein, an axial collar secures the dynamic sealing device in a seat formed in a head portion of the piston member. In other embodiments of the invention, a threaded retainer secures the sealing device in a seat formed in a head portion of the piston member.

The subject invention is also specifically directed to a dynamic seal assembly for a valve having an upstream pressure side and a downstream pressure side. The dynamic seal assembly includes an annular seal member having a generally C-shaped cross-section formed by opposed upstream and downstream legs that define an internal cavity.

The opening faces toward the upstream pressure side of the valve, as is conventional. The upstream leg of the seal member has a radial length that is greater than a radial length of the downstream leg. Additionally, the upstream leg includes a retaining foot that extends angularly away in an upstream direction at an angle of between about 0° and 90°.

The seal assembly further includes a metallic spring disposed within the internal cavity of the seal member for providing a constant sealing force to the seal member. The spring member is preferably a helically wound metallic spring.

These and other features of the dynamic sealing device of the subject invention and the manner in which it is employed within a valve assembly for a fuel injector will become more readily apparent to those having ordinary skill in the art from the following description of the preferred embodiments of the subject invention taken in conjunction with the several drawings described below.

BRIEF DESCRIPTION OF THE DRAWINGS

So that those skilled in the art to which the subject invention appertains will readily understand how to make and use the dynamic valve seal of subject invention without undue experimentation, preferred embodiments thereof will be described in detail herein below with reference to certain figures, wherein.

DETAILED DESCRIPTION OF PREFERRED EMBODIMENTS

Figure 1:
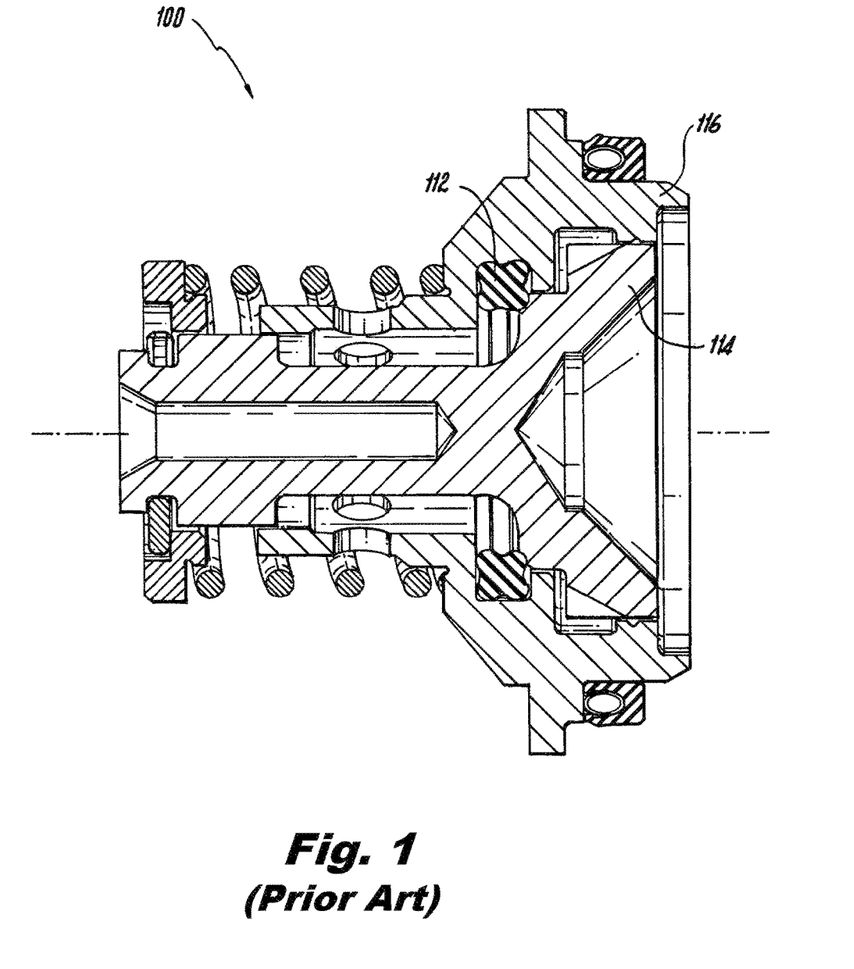
FIG. 1 is a side elevational view, in cross-section of a prior art check valve with an elastomer quad ring seal associated with the piston member for isolating the upstream pressure side of the valve from the downstream pressure side of the valve.

Referring now to the drawings, wherein like reference numerals identify similar structural features or aspects of the subject invention, there is illustrated in FIG. 1 a prior art check valve assembly designated generally by reference numeral 100. Valve assembly 100 includes an elastomer quad ring seal 112 that is associated with a piston member 114 disposed in a sleeve member 116. The quad ring seal 112 sealingly isolates the upstream pressure side of the valve assembly 100 from the downstream pressure side of the valve assembly 100. Check valve assembly 100 is used to control the flow of fuel through a single stage fuel injector of a gas turbine engine. The elastomer quad ring seal 112 limits the allowable operating temperature of the valve assembly 100.

Figure 2:
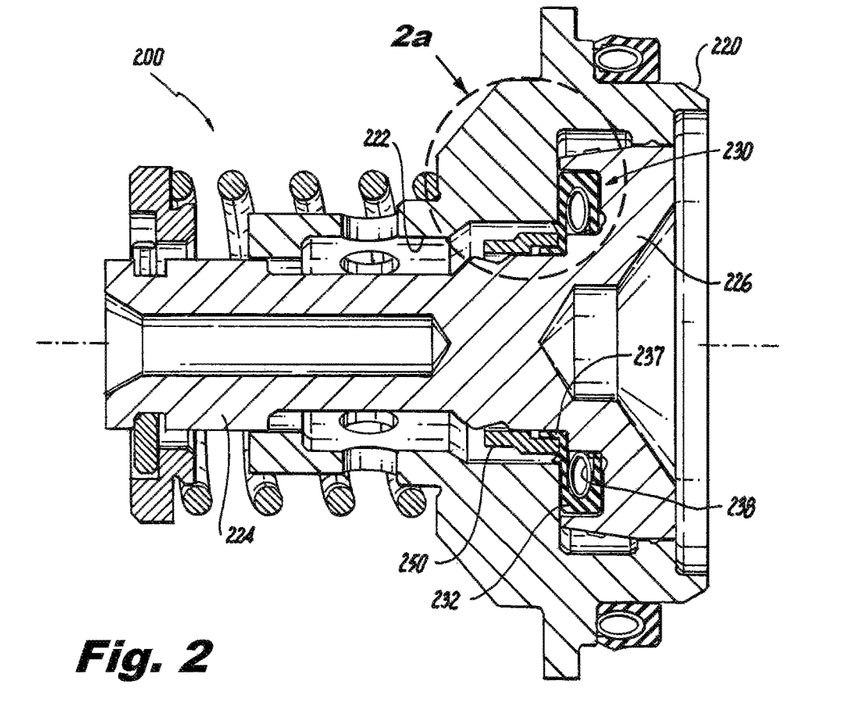
FIG. 2 is a side elevational view, in cross-section a check valve with a spring energized PTFE seal that is configured and arranged in accordance with the subject invention.

In contrast to the prior art check valve assembly 100 shown in FIG. 1, there is illustrated in FIG. 2 a check valve assembly constructed in accordance with a preferred embodiment of the subject invention and designated generally by reference numeral 200. Check valve assembly 200 includes a sleeve member 220 having an interior chamber 222, and a piston member 224 supported for movement within the interior chamber 222 of the sleeve member 220. The piston member 224 has a head portion 226 that separates or otherwise delimits an upstream pressure side of the check valve assembly 200 and a downstream pressure side of the check valve assembly 200.

A dynamic sealing device 230 is mounted to the piston member 224 for sealingly isolating the upstream pressure side of the valve assembly 200 from the downstream pressure side of the valve assembly 200. Those skilled in the art will readily appreciate that the dynamic sealing device 230 can alternatively be mounted to the sleeve member 220 depending upon the application.

Figure 2A:
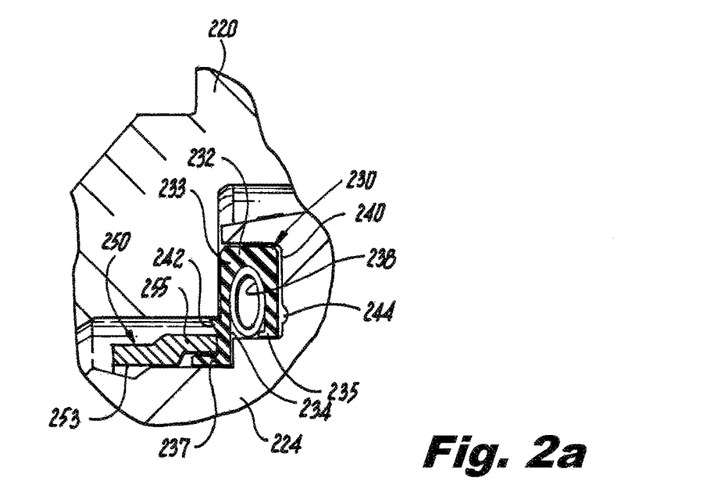
FIG. 2a is a localized view of the dynamic seal shown in FIG. 2, which includes an elongated upstream leg with a retaining foot that extends angularly away from the upstream leg at 90° angle and is secured in place by a retaining ring.

As best seen in FIG. 2a, the dynamic sealing device 230 includes an annular seal member 232 having a generally C-shaped cross-section. Seal member 232 includes opposed upstream and downstream legs 233 and 235 that define an internal cavity 234 having an opening about the inner periphery thereof. As is typical, the opening of the internal cavity 234 of seal member 232 faces toward the upstream pressure side of the valve assembly 200. The upstream pressure acts upon the interior cavity 234 of the seal member 232 increasing the force on the sealing surfaces thereof.

The dynamic sealing device 230 also includes a spring member 238 that is disposed within the internal cavity 234 of the seal member 232 to provide a constant sealing force to the seal member 232. Preferably, the spring member 238 is a helically wound metallic spring. Other springs, including springs with a plurality fingers may also be utilized in the dynamic sealing device 230 to provide a constant sealing force to the seal member 232.

With continuing reference to FIG. 2a, the upstream leg 233 of seal member 232 has a radial length that is greater than the radial length of the downstream leg 235. In addition, the upstream leg 233 of seal member 232 includes a retaining foot 237 that extends angularly away from the upstream leg 233 in an upstream direction. The retaining foot 237 extends angularly away from the upstream leg 233 of seal member 232 at a 90° angle.

An axial collar 250 secures the dynamic sealing device 230 in a seat 240 formed in a head portion 226 of the piston member 224 of the check valve assembly 200. More particularly, the axial collar 250 includes first portion 253 that is in direct contact with the piston member 224 and a second portion 255 that holds the retaining foot 237 against the piston member 224. By tightly securing the retaining foot 237 against the piston member 224, there is no path for debris to accumulate within the interior cavity 234 of the seal member 232.

The seal member 232 is preferably formed from PTFE (Teflon®). PTFE has a greater temperature resistance than both Viton® and Kalrez®, and has a far wider operating performance range that extends from −423° F. to 572° F. PTFE provides low friction, good wear resistance and it is chemically inert and non-aging. The shape of the PTFE seal member 232 can be varied to allow for better retention in the check valve assembly 200. In particular, as best seen in FIG. 2a, the seal member 232 includes exterior surface features 242 for engaging corresponding surface features on the sleeve member 220 and/or exterior surface features 244 for engaging corresponding surface features on the piston member 224.

Figure 3:
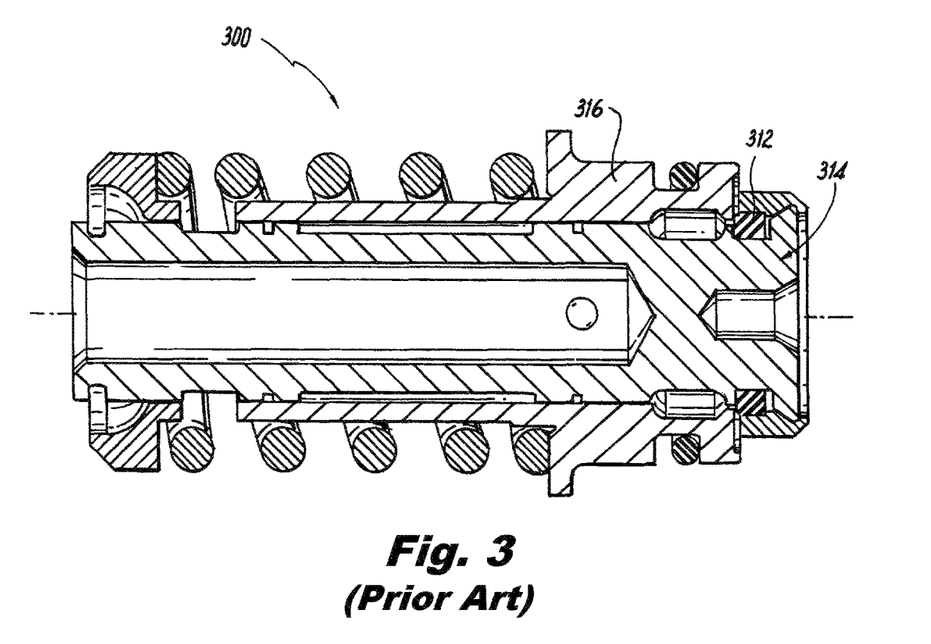
FIG. 3 is a side elevational view, in cross-section of a prior art schedule valve with an elastomer O-ring seal associated with the piston member for isolating the upstream pressure side of the valve from the downstream pressure side of the valve.

Referring to FIG. 3, there is illustrated a prior art schedule valve assembly designated generally by reference numeral 300, which includes an elastomer O-ring seal 312 associated with a piston member 314 disposed in a sleeve member 316. The O-ring seal 312 isolates the upstream pressure side of the valve assembly 300 from the downstream pressure side of the valve assembly 300. Schedule valve assembly 300 is used to meter the flow of fuel through a single stage fuel injector of a gas turbine engine. The elastomer O-ring seal 312 limits the allowable operating temperature of the schedule valve assembly 200.

Figure 4:
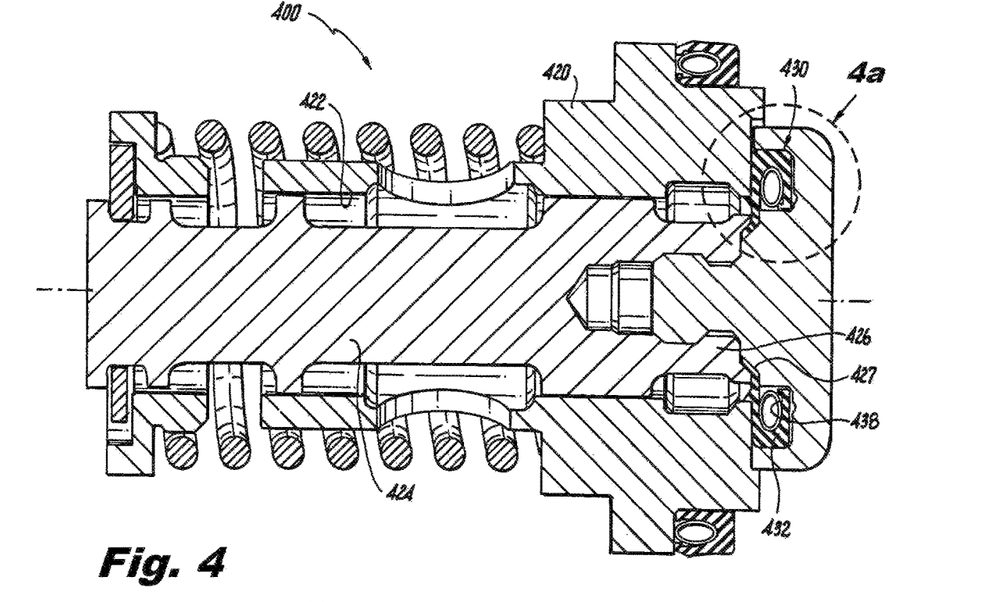
FIG. 4 is a side elevational view, in cross-section a schedule valve with a spring energized PTFE seal that is configured and arranged in accordance with the subject invention.

In contrast to the prior art schedule valve assembly 300 shown in FIG. 3, there is illustrated in FIG. 4 a schedule valve assembly constructed in accordance with a preferred embodiment of the subject invention and designated generally by reference numeral 400. Schedule valve assembly 400 includes a sleeve member 420 having an interior chamber 422, and a piston member 424 supported for movement within the interior chamber 422 of the sleeve member 420. The piston member 424 has a head portion 426 which connects to threaded retainer 450.

A dynamic sealing device 430 is mounted to the piston member 424 for sealingly isolating the upstream pressure side of the valve assembly 400 from the downstream pressure side of the valve assembly 400. Those skilled in the art will readily appreciate that the dynamic sealing device 430 can otherwise be mounted to the sleeve member 420 depending upon the application.

Figure 4A:
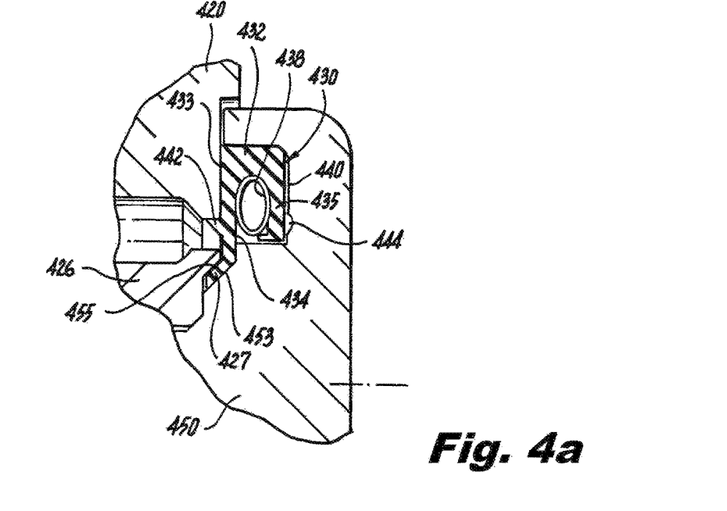
FIG. 4a is a localized view of the dynamic seal shown in FIG. 4, which includes an elongated upstream leg with a retaining foot that extends angularly away from the upstream leg at a 45° angle and is retained between the head portion of the valve piston and a threaded retainer.

As best seen in FIG. 4a, the dynamic sealing device 430 includes an annular seal member 432 formed from PTFE and having a generally C-shaped cross-section. Seal member 432 includes opposed upstream and downstream legs 433 and 435 that define an internal cavity 434 having an opening about the inner periphery thereof. As is typical, the opening of the internal cavity 434 of seal member 432 faces toward the upstream pressure side of the valve assembly 400.

The dynamic sealing device 430 also includes a spring member 438 that is disposed within the internal cavity 434 of the seal member 432 to provide a constant sealing force to the seal member 432. Preferably, the spring member 438 is a helically wound metallic spring. Other springs, including springs with a plurality fingers may also be utilized in the dynamic sealing device 430 to provide a constant sealing force to the seal member 432.

With continuing reference to FIG. 4a, the upstream leg 433 of seal member 432 has a radial length that is greater than the radial length of the downstream leg 435. In addition, the upstream leg 433 of seal member 432 includes a retaining foot 427 that extends angularly away from the upstream leg 433 in an upstream direction. The retaining foot 427 extends angularly away from the upstream leg 433 of seal member 432 at a 45° angle.

A threaded retainer 450 secures the sealing device 430 in a seat 440 formed in a head portion 426 of the piston member 424 of the schedule valve assembly 400. More particularly, the retaining foot 427 is retained between an angled surface 453 of the threaded retainer 450 and a complementary angled surface 455 formed on the head portion 426 of the piston member 424. By tightly securing the retaining foot 427 in this manner, there is no path for debris to accumulate within the interior cavity 434 of the seal member 432. Moreover, supporting the seal member 432 this way prevents the internal pressure acting on the interior cavity 434 from deforming/extruding the PTFE.

Threaded retainer 450 and a head portion 426 of the piston member 424 separate an upstream pressure side of the schedule valve assembly 400 from a downstream pressure side of the schedule valve assembly 400. The seal member 432 includes exterior surface features 442 for engaging corresponding surface features on the sleeve member 420 and/or exterior surface features 444 for engaging corresponding surface features on the retainer 450 and/or piston member 424.

Figure 5:
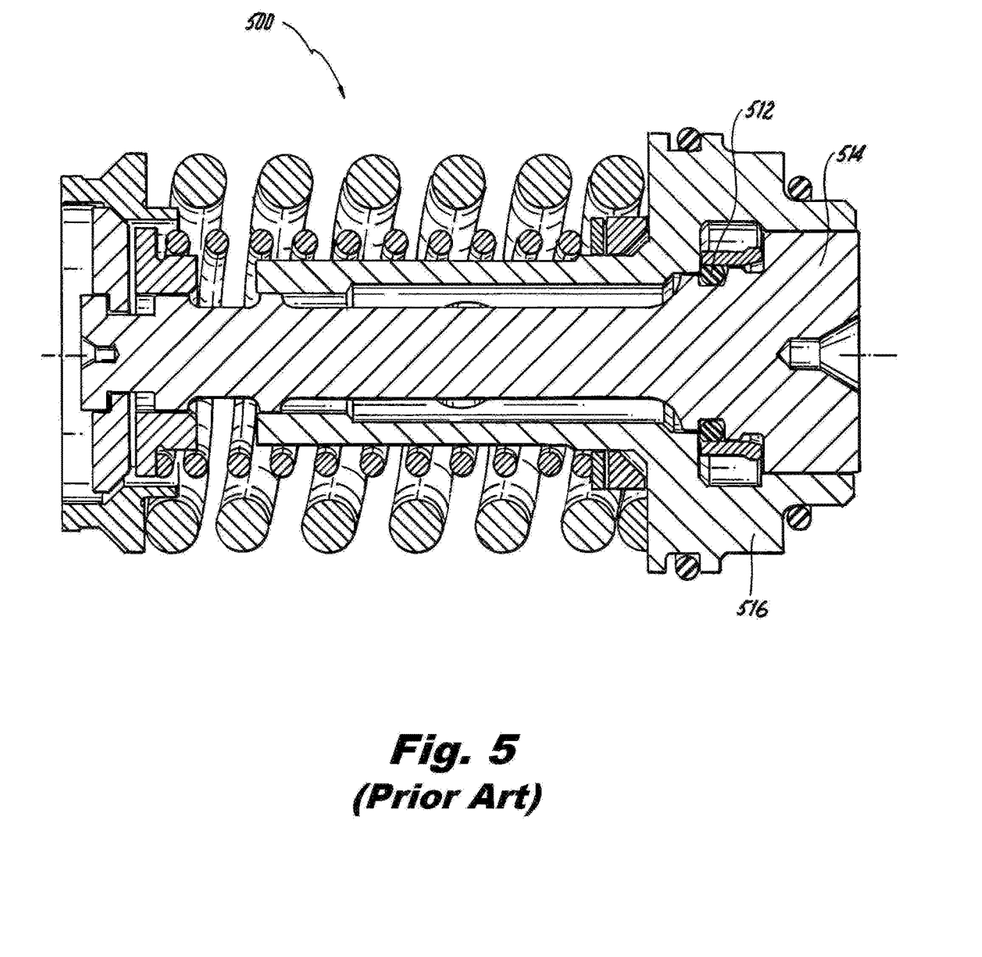
FIG. 5 is a side elevational view, in cross-section of a prior art integral valve in the form of a combined schedule valve and check valve, which has an elastomer O-ring seal associated with the piston member for isolating the upstream pressure side of the valve from the downstream pressure side of the valve.

Referring now to FIG. 5, there is a prior art integral valve assembly in the form of a combined schedule valve and check valve, which is designated generally by reference numeral 500. This type of valve is often used in a two stage fuel injector having a main fuel path and a pilot fuel path. Integral valve assembly 500 includes an elastomer O-ring seal 512 associated with a piston member 514 disposed in a sleeve member 516. The O-ring seal 512 isolates the upstream pressure side of the integral valve assembly 500 from the downstream pressure side of the integral valve assembly 500. Another example of a prior art combined check valve and metering valve assembly that employs elastomer O-ring seal is disclosed in commonly assigned U.S. Pat. No. 5,732,730, to Shoemaker et al., the disclosure of which is herein incorporated by reference in its entirety. The elastomer O-ring seals used in these prior art devices tend to limit the allowable operating temperature of the schedule valve assembly 500.

Figure 6:
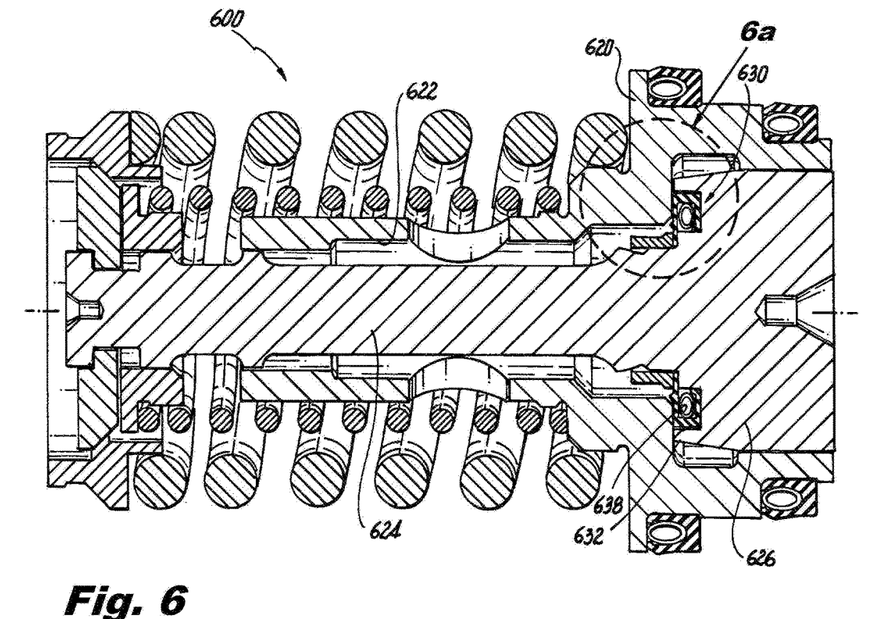
FIG. 6 is a side elevational view, in cross-section an integral valve with a spring energized PTFE seal arranged in accordance with the subject invention.

In contrast to the prior art integral valve assembly 500 shown in FIG. 5, there is illustrated in FIG. 6 an integral valve assembly constructed in accordance with a preferred embodiment of the subject invention and designated generally by reference numeral 600. Integral valve assembly 600 includes a sleeve member 620 having an interior chamber 622, and a piston member 624 supported for movement within the interior chamber 622 of the sleeve member 620. The piston member 624 has a head portion 626 that separates an upstream pressure side of the integral valve assembly 600 from a downstream pressure side of the integral valve assembly 600.

Figure 6A:
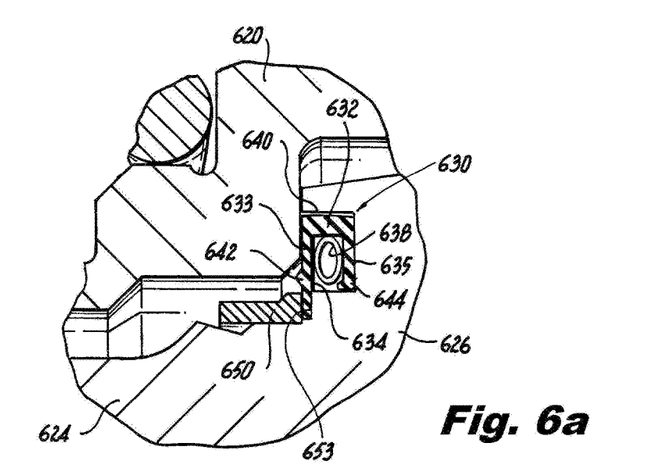
FIG. 6a is a localized view of the dynamic seal shown in FIG. 6, which includes an elongated upstream leg that is secured by a retaining ring.

As best seen in FIG. 6a, a dynamic sealing device 630 is mounted to the piston member 624 for sealingly isolating the upstream pressure side of the valve assembly 600 from the downstream pressure side of the valve assembly 600. Those skilled in the art will readily appreciate that the dynamic sealing device 630 can instead be mounted to the sleeve member 620.

The dynamic sealing device 630 includes a spring energized PTFE seal member 632 having a generally C-shaped cross-section. Seal member 632 includes opposed upstream and downstream legs 633 and 635 that define an internal cavity 634 having an opening about the inner periphery thereof. As is typical, the internal cavity 634 of seal member 632 faces toward the upstream pressure side of the valve assembly 600. A helical metallic spring member 638 is disposed within the internal cavity 634 of the seal member 632 for providing a constant sealing force to the seal member 632.

The upstream leg 633 of seal member 632 has a radial length that is greater than the radial length of the downstream leg 635. A retainer ring 650 surrounds the sealing device 630 to secure it in a seat 640 formed in a head portion 626 of the piston member 624 of the schedule valve assembly 600. More particularly, the retaining ring 650 secures the upstream leg 633 against a retaining surface 653 formed on the head portion 626 of piston 624. By tightly securing the upstream leg 633 in this manner, there is no path for debris to accumulate within the interior cavity 634 of the seal member 632. Moreover, supporting the seal member 632 this way prevents the internal pressure acting on the interior cavity 634 from deforming/extruding the PTFE.

The seal member 632 includes exterior surface features 642 for engaging corresponding surface features on the sleeve member 620 and/or exterior surface features 644 for engaging corresponding surface features on the head portion 626 of the piston member 624.

While the dynamic valve seal of the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A dynamic seal assembly for a valve having an upstream pressure side and a downstream pressure side, the dynamic seal assembly comprising:
    a) an annular seal member seated in a valve head of a piston member having a generally C-shaped cross-section and including opposed upstream and downstream legs defining an internal cavity with an opening, wherein the opening of the internal cavity faces inward from an inner periphery of the seal member, wherein the upstream leg has a radial length that is greater than a radial length of the downstream leg and includes a retaining foot that extends angularly away from the upstream leg in an upstream direction at an angle of between about 0° and 90°; and
    b) a metallic spring disposed within the internal cavity of the seal member for providing a constant sealing force to the seal member.

2. A dynamic seal assembly as recited in claim 1, wherein the seal member is formed from PTFE.

3. A dynamic seal assembly as recited in claim 1, wherein the spring member is a helically wound metallic spring.

* * * * *